(12) United States Patent
Zhang et al.

(10) Patent No.: US 11,413,782 B2
(45) Date of Patent: Aug. 16, 2022

(54) CHAIN SAW

(71) Applicant: Globe (Jiangsu) Co., Ltd, Jiangsu (CN)

(72) Inventors: Lingao Zhang, Jiangsu (CN); Jingshan Li, Jiangsu (CN); Zhiwei Zong, Jiangsu (CN); Lianzhi Ren, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 3 days.

(21) Appl. No.: 17/074,534

(22) Filed: Oct. 19, 2020

(65) Prior Publication Data

US 2021/0114248 A1   Apr. 22, 2021

(30) Foreign Application Priority Data

Oct. 18, 2019   (CN) .......................... 201921748973.8

(51) Int. Cl.
*B27B 17/00* (2006.01)
(52) U.S. Cl.
CPC ................. *B27B 17/0008* (2013.01)
(58) Field of Classification Search
CPC ..... B27B 17/00; B27B 17/02; B27B 17/0033; B27B 17/0008
USPC .................................................. 30/381–387
See application file for complete search history.

(56) References Cited

U.S. PATENT DOCUMENTS

| | | | | |
|---|---|---|---|---|
| 3,131,277 A | * | 4/1964 | Brenzen | H01H 21/10 200/522 |
| 3,368,595 A | * | 2/1968 | Gutjahr | B27B 17/0016 30/382 |
| 3,542,095 A | * | 11/1970 | Hammond | B27B 17/0008 30/381 |
| 3,637,029 A | * | 1/1972 | Sherwood, Jr. | B27B 17/00 173/162.2 |
| 3,652,074 A | * | 3/1972 | Frederickson | B27B 17/00 267/137 |
| 3,728,793 A | * | 4/1973 | Makinson | B27B 17/02 30/383 |

(Continued)

FOREIGN PATENT DOCUMENTS

| | | |
|---|---|---|
| CN | 110509356 A | 11/2019 |
| CN | 211362618 U | 8/2020 |

OTHER PUBLICATIONS

Partial European Search Report of counterpart European Patent Application No. 20202650.6 dated Feb. 25, 2021.

*Primary Examiner* — Jason Daniel Prone
*Assistant Examiner* — Richard D Crosby, Jr.

(57) ABSTRACT

A chain saw includes a housing, the housing including a first housing, a second housing, and a receiving cavity formed by the first housing and the second housing; a cutter including a blade chain and a blade bar for supporting the blade chain, the cutter being mounted on the housing; a power assembly, the power assembly including a drive unit for driving the cutter and a power supply unit for supplying power to the drive unit; a front handle connected to the second housing and surrounding the first housing, the front handle including a grip portion, a first and second fixing parts which are located at two ends of the grip portion, the first fixing part abutting on the side wall of the second housing, and the second fixing part being located at the bottom of the housing and connecting with the second housing.

12 Claims, 12 Drawing Sheets

(56) References Cited

U.S. PATENT DOCUMENTS

| | | | | |
|---|---|---|---|---|
| 3,934,344 A * | 1/1976 | Inaga | B27B 17/0033 | 30/381 |
| 4,041,606 A * | 8/1977 | Thompson | B27B 17/0033 | 30/381 |
| 4,059,895 A * | 11/1977 | Hirschkoff | B27B 17/08 | 30/382 |
| 4,141,143 A * | 2/1979 | Hirschkoff | F16F 3/10 | 30/381 |
| 4,160,321 A * | 7/1979 | Kallberg | B27B 17/0008 | 30/383 |
| 4,202,096 A | 5/1980 | Nagashima | | |
| 4,324,045 A * | 4/1982 | Hoppner | B27B 17/0033 | 30/381 |
| 4,411,071 A * | 10/1983 | Takahashi | F16F 15/08 | 30/381 |
| 4,670,985 A * | 6/1987 | Biersteker | B27B 17/0033 | 173/162.1 |
| 4,680,862 A * | 7/1987 | Wieland | B27B 17/08 | 30/381 |
| 4,693,006 A * | 9/1987 | Wehle | B27B 17/0033 | 173/162.2 |
| 4,694,578 A * | 9/1987 | Kemmler | B25F 5/006 | 123/195 R |
| 4,785,539 A * | 11/1988 | Nagashima | B27B 17/0008 | 30/381 |
| 4,805,308 A * | 2/1989 | Ritola | B27B 17/083 | 30/382 |
| D303,207 S * | 9/1989 | Nakajima | D8/65 | |
| 4,964,217 A * | 10/1990 | Siede | B27B 17/0008 | 30/381 |
| 5,016,355 A * | 5/1991 | Gassen | B27B 17/0008 | 173/162.1 |
| 5,029,393 A * | 7/1991 | Nagashima | F02B 63/02 | 30/383 |
| 5,233,945 A * | 8/1993 | Wolf | F02B 63/02 | 123/41.7 |
| 5,243,764 A * | 9/1993 | Wieland | B27B 17/02 | 30/381 |
| 5,570,512 A * | 11/1996 | Hoppner | B27B 17/0008 | 30/381 |
| 5,960,549 A * | 10/1999 | Hoppner | B27B 17/0008 | 30/381 |
| 6,016,604 A * | 1/2000 | Wolf | B25F 5/006 | 30/382 |
| 6,427,641 B1 * | 8/2002 | Ziegs | B27B 17/0008 | 123/41.56 |
| 6,575,285 B2 * | 6/2003 | Jong | B27B 17/08 | 192/131 R |
| 6,779,514 B2 * | 8/2004 | Zimmermann | F02M 31/145 | 123/556 |
| 6,799,373 B2 * | 10/2004 | Menzel | B27B 17/0033 | 30/381 |
| 6,994,068 B2 * | 2/2006 | Menzel | F02B 63/02 | 123/192.1 |
| 7,287,331 B2 * | 10/2007 | Sasaki | A01G 3/053 | 16/110.1 |
| 7,293,330 B2 * | 11/2007 | Guip | B27B 17/0008 | 16/422 |
| 8,490,289 B2 * | 7/2013 | Nystrom | B27B 17/0008 | 30/166.3 |
| 8,539,681 B2 * | 9/2013 | Stein | B27B 17/0033 | 30/381 |
| 8,627,899 B2 * | 1/2014 | Gabrielsson | B27B 17/0008 | 173/162.1 |
| 8,697,209 B2 * | 4/2014 | Glissmann | B25F 5/006 | 428/35.7 |
| 8,973,276 B2 * | 3/2015 | Van Bijsterveldt | B27G 19/003 | 30/382 |
| 10,814,517 B2 * | 10/2020 | Suzuki | B27B 17/0008 | |
| 2001/0010122 A1 * | 8/2001 | Taomo | B27B 17/0033 | 30/383 |
| 2001/0010123 A1 * | 8/2001 | Taomo | B27B 17/0008 | 30/383 |
| 2010/0083512 A1 * | 4/2010 | Shimokawa | F01N 13/002 | 30/381 |
| 2012/0055034 A1 * | 3/2012 | Andersson | B25G 1/01 | 30/383 |
| 2012/0324743 A1 * | 12/2012 | Bergquist | B25F 5/02 | 30/381 |
| 2014/0190713 A1 * | 7/2014 | Martinsson | A01G 3/086 | 173/20 |
| 2014/0215838 A1 | 8/2014 | Bergquist | | |
| 2014/0290074 A1 * | 10/2014 | Takayanagi | B23D 57/023 | 30/382 |
| 2015/0375416 A1 * | 12/2015 | Haneda | B27B 17/0008 | 30/383 |
| 2016/0047401 A1 * | 2/2016 | Takayanagi | F04B 53/22 | 92/31 |
| 2017/0203462 A1 * | 7/2017 | Haneda | B27B 17/00 | |
| 2017/0259452 A1 * | 9/2017 | Kachi | B27B 17/00 | |
| 2018/0013329 A1 * | 1/2018 | Aoyama | H02K 21/22 | |
| 2018/0079101 A1 * | 3/2018 | Towner | B27B 17/08 | |
| 2019/0111582 A1 | 4/2019 | Suzuki et al. | | |
| 2020/0030959 A1 * | 1/2020 | Freymueller | B25F 5/006 | |
| 2020/0338780 A1 * | 10/2020 | Watanabe | B27B 17/083 | |

* cited by examiner

CHAIN SAW

CROSS-REFERENCE TO RELATED APPLICATIONS

This application is a US application which claims the priority of CN Application Serial No. 201921748973.8, filed on Oct. 18, 2019, the disclosures of which are hereby incorporated by reference in their entirety.

TECHNICAL FIELD

The present invention relates to a power tool, in particular to an electrically powered chain saw.

BACKGROUND

Chain saw is powered by gasoline, electricity or hydraulics and mainly used for cutting. The chain saw has two handles respectively located at two opposite ends of a housing thereof. One handle is located at a rear end of the housing and provided with a trigger thereon. The other handle is located at a front end of the housing. The stability of the chainsaw can be ensured through the front handle grasped by one hand of the operator to control the working direction and the rear handle grasped by the other hand of the operator during operation.

However, the front handle is only designed based on improving the comfortability when grasped by the operator and reducing the fatigue of long-term operating the chain saw. Therefore, most of the front handles are designed to have one end fixed to the left housing and the other end fixed to the right housing, or designed to locate at one side of the housing as a whole for being grasped from the side. However, these designed front handles often cause the break of the housing when the chain saw are accidentally dropped. The left and right housings need to be manufactured with higher strength to avoid the above break. Meanwhile the production efficiency is reduced because the housing is flipped many times during production and assembly. In addition, when a protective plate of the chain saw is rotated, the debris generated by the chainsaw enter inside of the chainsaw to threaten the operation of the internal brake and the transmission structure and then the service life of the chain saw is reduced.

As such, there is a requirement to provide an improved chain saw to solve the above-mentioned problems.

SUMMARY OF THE INVENTION

The purpose of the present invention is to provide a chain saw which has a simple structure, is safe and comfortable to use, and is convenient in production and installation. While ensuring the mechanical strength of the chain saw in use, the chain saw has been optimized and reduced in production costs. The stable operation and service life are improved, which is suitable for promotion and use.

In order to achieve the above-mentioned object of the invention, the present invention provides A chain saw, comprises a housing, the housing including a first housing, a second housing, and a receiving cavity formed by the first housing and the second housing; a cutter including a blade chain and a blade bar for supporting the blade chain, the cutter being mounted on the housing; a power assembly, the power assembly comprising a drive unit for driving the cutter and a power supply unit for supplying power to the drive unit; a front handle connected to the second housing and surrounding the first housing, the front handle comprising a grip portion, a first and second fixing parts which are located at two ends of the grip portion, the first fixing part abutting on the side wall of the second housing, and the second fixing part being located at the bottom of the housing and connecting with the second housing As a further improvement of the present invention, the second housing is provided with a holding portion for defining the second fixing part, and the holding portion extends downward from the side wall of the second housing.

As a further improvement of the present invention, a receiving groove for receiving the second fixing part is provided at the bottom of the housing, and the holding portion is located at an end of the receiving groove.

As a further improvement of the present invention, the receiving groove is formed by recessing from the bottom of the first housing and the second housing toward the inside of the housing.

As a further improvement of the present invention, the second fixing part is connected and positioned with the second housing through a locking structure, and the locking structure penetrates the holding portion from a side wall of the second housing and protrudes into the second fixing part, so that the second fixing part is fixedly connected to the second housing.

As a further improvement of the present invention, the second housing is provided with a mounting groove recessed from a side wall thereof into the housing and a mounting portion detachably mounted on a side wall of the second housing, the mounting portion being engaged with the mounting groove to form a mounting cavity for receiving the cutter.

As a further improvement of the present invention, the holding portion is provided with a step portion which is located in the mounting groove, and the step portion is formed by recessing to the inside of the housing from the surface of the mounting groove, and the second fixing part is connected and positioned with the second housing through a locking structure penetrating the non-step portion and the step portion of the holding portion.

As a further improvement of the present invention, the housing further comprises a rear handle provided at the rear end thereof, the rear handle is provided with a control trigger for controlling the drive unit, and the control trigger is partially received in the rear handle.

As a further improvement of the present invention, a protective plate is provided on the top of the housing, the protective plate being at the front of the grip portion, and the height of the protective plate being higher than that of the grip portion, the width of the protective plate being larger than that of the housing.

As a further improvement of the present invention, the protective plate is connected to a braking mechanism, the braking mechanism is a mechanical braking mechanism and/or an electronic braking structure, and the braking mechanism is housed in the receiving cavity.

As a further improvement of the present invention, the mounting groove is provided with a middle cover, and the protective plate connects with the braking mechanism received in the receiving cavity through the connecting port provided on the second housing, the middle cover covering the protective plate and the mounting groove, and the middle cover comprising a discharge port corresponding to the connecting port.

As a further improvement of the present invention, the power supply unit comprises a power supply socket, and the power supply socket is disposed between the rear handle and the front handle.

As a further improvement of the present invention, the power supply unit comprises at least one battery pack, the housing is provided with an engaging member for engaging the battery pack, and the engaging member is disposed on the first housing and/or the second housing.

As a further improvement of the present invention, the housing includes an outlet opening to discharge the sawdust brought inside the chain saw when cutting to the outside of the housing, and the outlet opening is located at the bottom of the housing.

As a further improvement of the present invention, wherein the outlet opening comprises a first part communicating with the outside and a second part connecting to the first part and the inside of the housing, the second part comprising an inclined guide surface to guide the sawdust inside the housing to the first part to be discharged to the outside.

The beneficial effect of the present invention is that the chain saw of the present invention fixes and connects the first fixing part and the second fixing part of the front handle to the second housing. The assembly steps in the production process of the chain saw is simplified and the man-hour cost during the production and assembly of the chain saw is effectively saved. On the other hand, it effectively improves the load-bearing strength of the chain saw, and while meeting the performance of drop test of the chain saw, the manufacturing cost of the first housing is reduced and the cost of the chain saw is lowered, making the chain saw of the present invention suitable for production and use. The design of the discharge port greatly reduces the entry of sawdust into the chain saw, effectively avoiding the braking failure and the running jam of the chain saw.

DETAILED DESCRIPTION OF EMBODIMENTS

Figure 1:
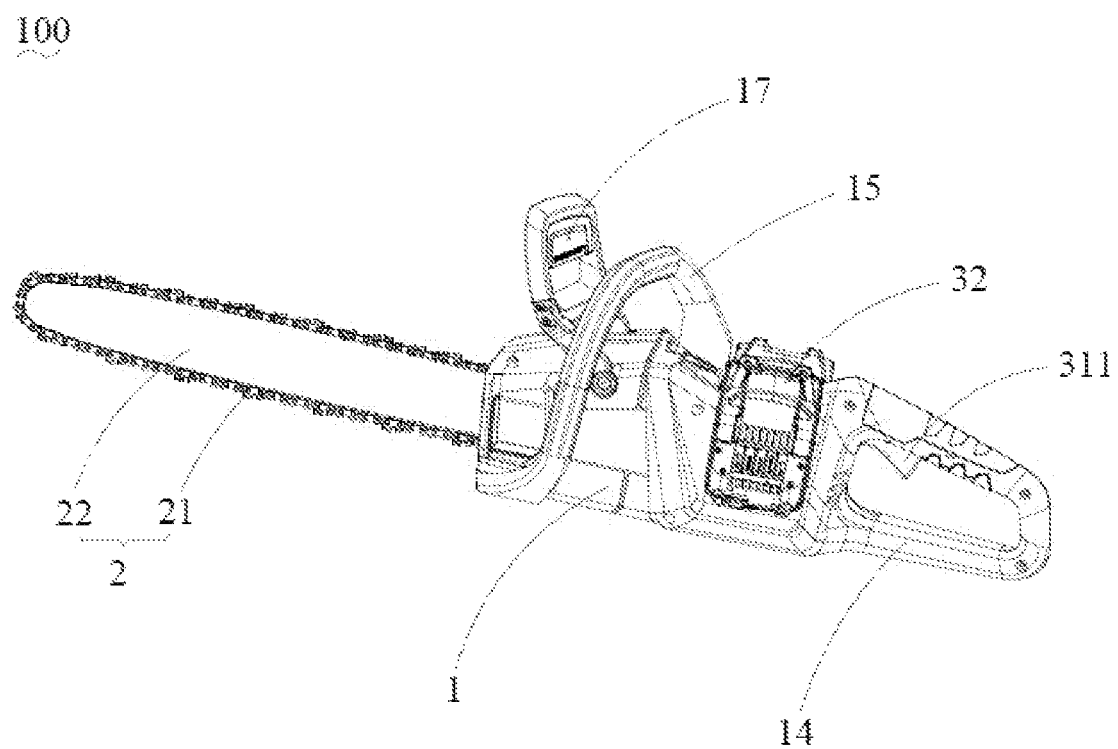
FIG. 1 is a perspective view of a chain saw in accordance with a first embodiment of the present invention.

In order to make the objectives, technical solutions and advantages of the present invention clearer, the present invention will be described in detail below with reference to the accompanying drawings and specific embodiment.

Examples of these preferred embodiments are illustrated in the drawings. The embodiments of the present invention shown in the drawings and described in accordance with the drawings are merely exemplary, and the present invention is not limited to these embodiments.

Here, it should also be noted that, in order to avoid obscuring the present invention due to unnecessary details, only the structure and/or processing steps closely related to the solution of the present invention are shown in the drawings, and other details that are not relevant to the present invention is omitted.

In addition, it should also be noted that the terms "including", "comprising" or any other variation thereof are intended to cover non-exclusive inclusion, so that a process, method, article or device including a series of elements not only includes those elements, but also includes other elements not explicitly listed, or elements inherent to the process, method, article, or device.

FIG. 1 to FIG. 4 depict a chain saw 100 according to a first embodiment of the present invention. The chain saw 100 includes a housing 1, a cutter 2 mounted on the housing 1 and a power assembly 3 received in the housing 1 for driving the cutter 2.

The housing 1 has a front end for fixedly connecting a cutter 2 and a rear end away from the cutter 2. The housing 1 has a longitudinally extending shaft, which defines the direction from the rear end to the cutter as a positive direction. The housing 1 includes a first housing 11 and a second housing 12 both extending along the positive direction. The first housing 11 and the second housing 12 are respectively located at two opposite sides of the housing 1. A receiving cavity 13 is formed by the first and second housings 11, 12. The first and second housings 11, 12 are interlocked with each other. The second housing 12 has a mounting groove 121 depressed from a side wall A thereof toward the first housing 11 and a mounting portion 122 detachably mounted thereto. The mounting portion 122 and the mounting groove 121 engage with each other and together form a mounting cavity (not labeled) for accommodating the cutter 2.

The housing 1 also includes a rear handle 14 located at the rear end thereof. The rear handle 14 is formed by the first and second housings 11, 12 and integrally formed with the housing, so as to increase the connecting stability between the housing 1 and the rear handle 14, simplify the manufacturing process and reduce the manufacturing cost. In other embodiments, the rear handle 14 is separated from the housing 1.

Figure 6:
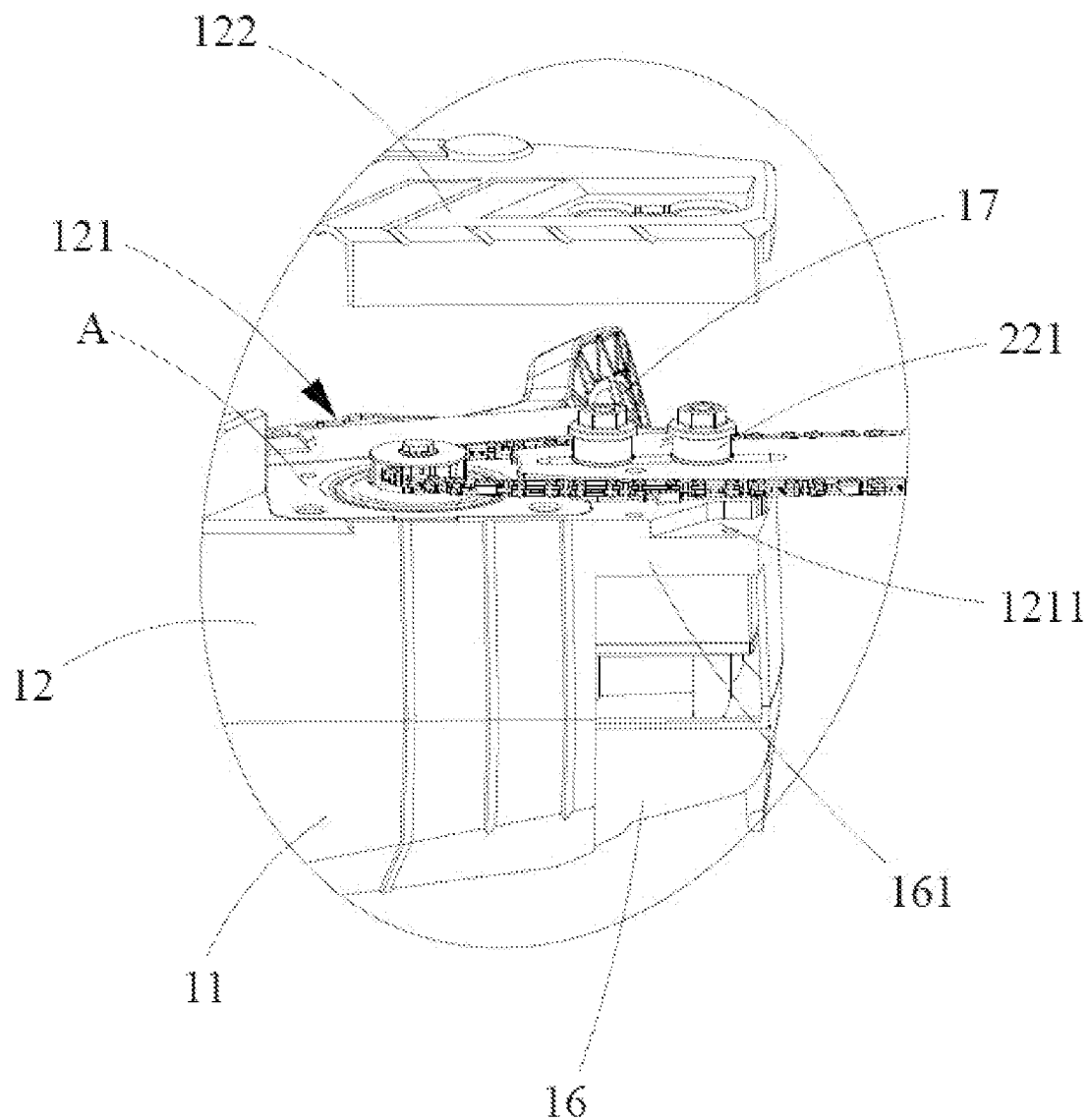
FIG. 6 is an enlarged view of a mounting groove of chain saw shown in FIG. 4.
Figure 7:
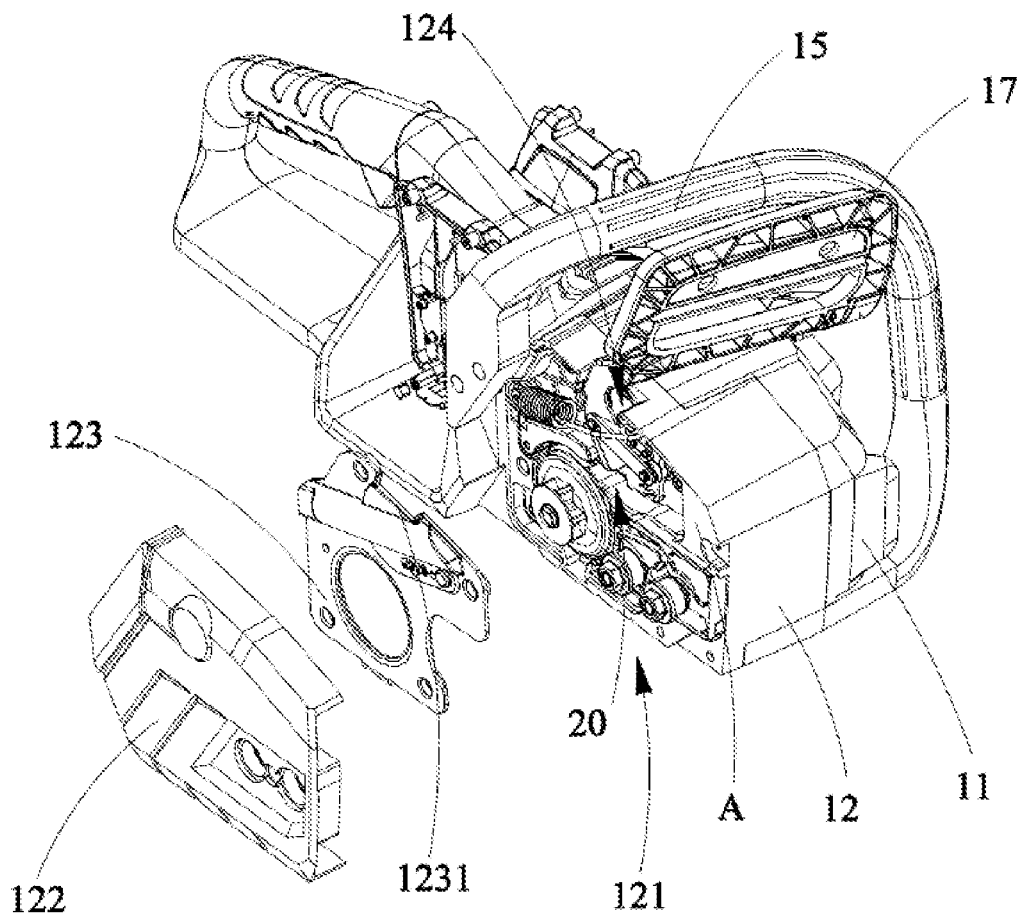
FIG. 7 is a partially exploded view of a chain saw in accordance with a second embodiment of the present invention.

Please referring to FIG. 4 to FIG. 7, the housing 1 further includes a front handle 15 detachably connected to the second housing 12. The front handle 15 has an arch-shaped grip portion 151, a first and second fixing parts 152, 153 respectively located at two opposite ends of the grip portion 151. The grip portion 151 extends from one end of the first fixing part 152 in a direction away from the second housing 12. The grip portion 151 is arranged around the first housing 11 to avoid the first housing 11 from colliding with other objects, so that the first housing 11 is not required to provide with a reinforcement structure or a large thickness, therefore the manufacturing cost of the first housing 11 is reduced and the manufacturing cost of the chain saw 100 is reduced. The first fixing part 152 is fixedly connected to the side wall A of the second housing 12 and abuts against a rear edge of the mounting portion 122. The first fixing part 152 is located above the side of the mounting portion 122 (as shown in FIG. 7), so that the first fixing part 152 is easily and conveniently installed.

The second fixing part 153 is housed in the bottom of the housing 1 and fixedly connected to the second housing 12. Specifically, the housing 1 has a receiving groove 16 located at a bottom thereof. The receiving groove 16 corresponds to the second fixing part 153. A holding portion 161 is located at the end of the second fixing part 153 for defining the fixing position of the second fixing part 153, and in the present invention, the receiving groove 16 is recessed from the bottom of the first housing 11 and the second housing 12 to the inside of the housing 1. The holding portion 161 is formed from the side wall A of the second housing 12 or the surface of the mounting groove 121 extending downward.

Figure 4:
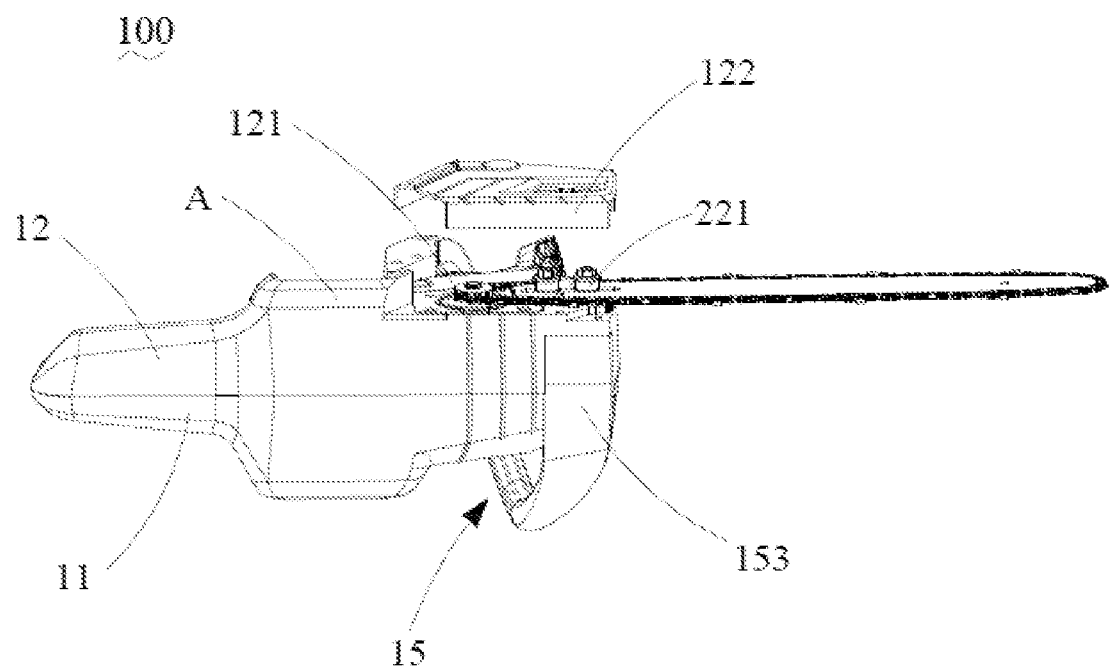
FIG. 4 is a partially exploded perspective of the chain saw in accordance with the present invention.
Figure 5:
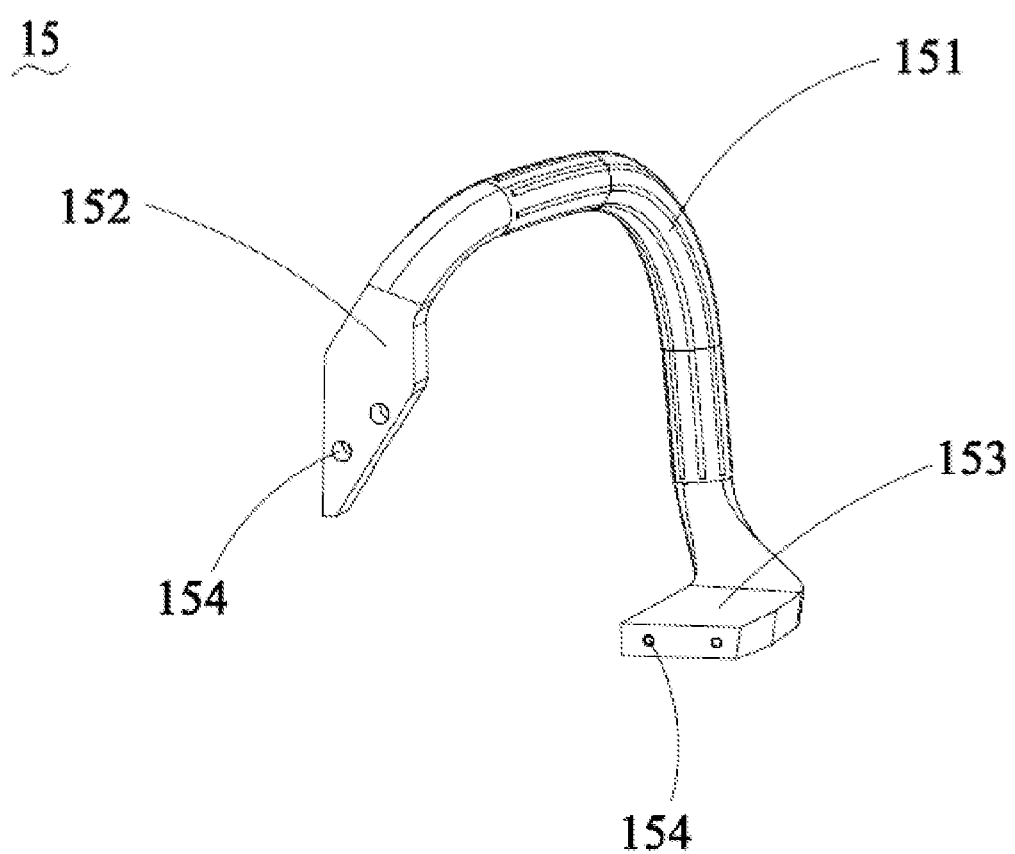
FIG. 5 is a perspective view of a front handle of the chain saw in accordance with the present invention.

When the second fixing part 153 is received in the receiving groove 16, the outer surface of the second fixing part 153 is level with the bottom of the housing 1, or protrudes from the bottom of the housing 1, or lower than the bottom of the housing 1, or housed in the receiving groove 16 (as shown in FIG. 4), so that the chain saw 100 can be stably placed on the ground.

In one embodiment of invention, the first fixing part 152 and the second fixing part 153 are both connected and positioned with the second housing 12 through a locking structure. Preferably, the locking structure is a screw 154. Specifically, when the first fixing part 152 is connected and positioned to the second housing 12 by the screw 154, the screw 154 penetrates the first fixing part 152 and is connected to the side wall A of the second housing 12 to connect and fix the first fixing part 152 and the second housing 12.

Further, when the second fixing part 153 is connected to the second housing 12 by the screw 154, the screw 154 penetrates the holding portion 161 from the side wall A of the second housing 12 and protrudes into the receiving groove 16 to be connected to the second fixing part 153. With this arrangement, the connection and positioning of the front handle 15 and the second housing 12 can be achieved without turning over the housing 1, which simplifies the production process of the chain saw 100 and improves the production efficiency of the chain saw 100. The purpose of reducing the production cost of the chain saw 100 is also achieved.

In this embodiment, the holding portion 161 is provided in the mounting groove 121, and the holding portion 161 is provided with a step portion 1211 (as shown in FIG. 6). Specifically, the step portion 1211 is formed by being recessed from the surface of the mounting groove 121 toward the housing 1, and the step portion 1211 is located at the front end of the bottom of the mounting groove 121, and the second fixing part 153 is connected to the second housing 12 by screws 154 that penetrate the non-step portion and the step portion 1211 of the holding portion 161 respectively. This arrangement can effectively prevent the screw 154 used to fix the second fixing part 153 from affecting the normal operation of the cutter 2 fixedly housed in the installation cavity.

It should be noted that, in the embodiment, only the screw 154 is used as an example to illustrate the locking structure. Of course, in other embodiments, the locking member can also be one of more of the connecting structures such as a bolt, a riveting piece, or a clamping piece.

In one embodiment, a protective plate 17 is further provided on the top of the housing 1. Specifically, the protective plate 17 is provided at the front of the grip portion 151, and the height of the protective plate 17 is higher than that of the grip portion 151. The width of the protective plate 17 is greater than that of the housing 1. When an accident occurs that the protective plate 17 is touched, the braking mechanism can be triggered to stop the operation of the cutter 2, which further improves the using safety of the chain saw 100.

In an embodiment of the invention, the protective plate 17 is further connected to a braking mechanism (20 in FIG. 7), and the braking mechanism 20 is electrically connected to the power assembly 3. This arrangement allows the protective plate 17 to be touched when an accident occurs. The braking mechanism 20 is triggered to stop the operation of the cutter 2, which further improves the using safety of the chain saw 100.

It should be noted that the braking mechanism can be any one of an electronic braking mechanism and/or a mechanical braking mechanism. The mechanical braking mechanism is operated by the protective plate 17 to realize braking mechanisms such as the torsion spring brake, or the steel band brake, or electromagnetic lock brakes. The electronic braking mechanism is actuated by the protective plate 17 to realize the action of the signal switch to control the power off or short-circuit of the motor. The combination of electronic brake and mechanical brake is operated by the protective plate 17 to realize the action of the signal switch to first realize the power off or short-circuit of the motor to make the brake, and at the same time, it immediately realizes the mechanical brake such as torsion spring brake, or steel band brake, or electromagnetic lock brake. The specific arrangement of the braking mechanism in the present invention is not limited here.

Specifically, one end of the protective plate 17 penetrates the second housing 12 and is rotatably connected in the receiving cavity 13, and the other end is connected to the side wall of the first housing 11. In another embodiment of the invention, the mounting groove 121 is also provided with a middle cover 123 (as shown in FIG. 7). Preferably, the middle cover 123 is a part of the side wall A and covers the mounting groove 121 and the protective plate 17 for encapsulating the braking mechanism and power assembly 3 in the chain saw 100.

The second housing 12 is provided with a connecting port 124 for accommodating the protective plate 17. The protective plate 17 penetrates the connecting port 124 and can rotate in the connecting port 124 to control the braking mechanism enclosed in the receiving cavity 13. Further, the middle cover 123 is provided with a discharge port 1231 corresponding to the connecting port 124, and the discharge port 1231 is formed on the middle cover 123 facing the connecting port 124 for communicating with the connecting port 124 to prevent the sawdust generated during the operation of the chain saw 100 from entering the inside of the chain saw 100 through the connecting port 124. At the same time, the sawdust enters the installation cavity along the discharge port 1231, and under the vibration of the chain saw 100 when in use and the gravity of the sawdust, it is discharged from the gap at the bottom of the installation cavity when the installation part 122 is combined with the mounting groove 121 to further improve the practicality of the chain saw 100.

Figure 8:
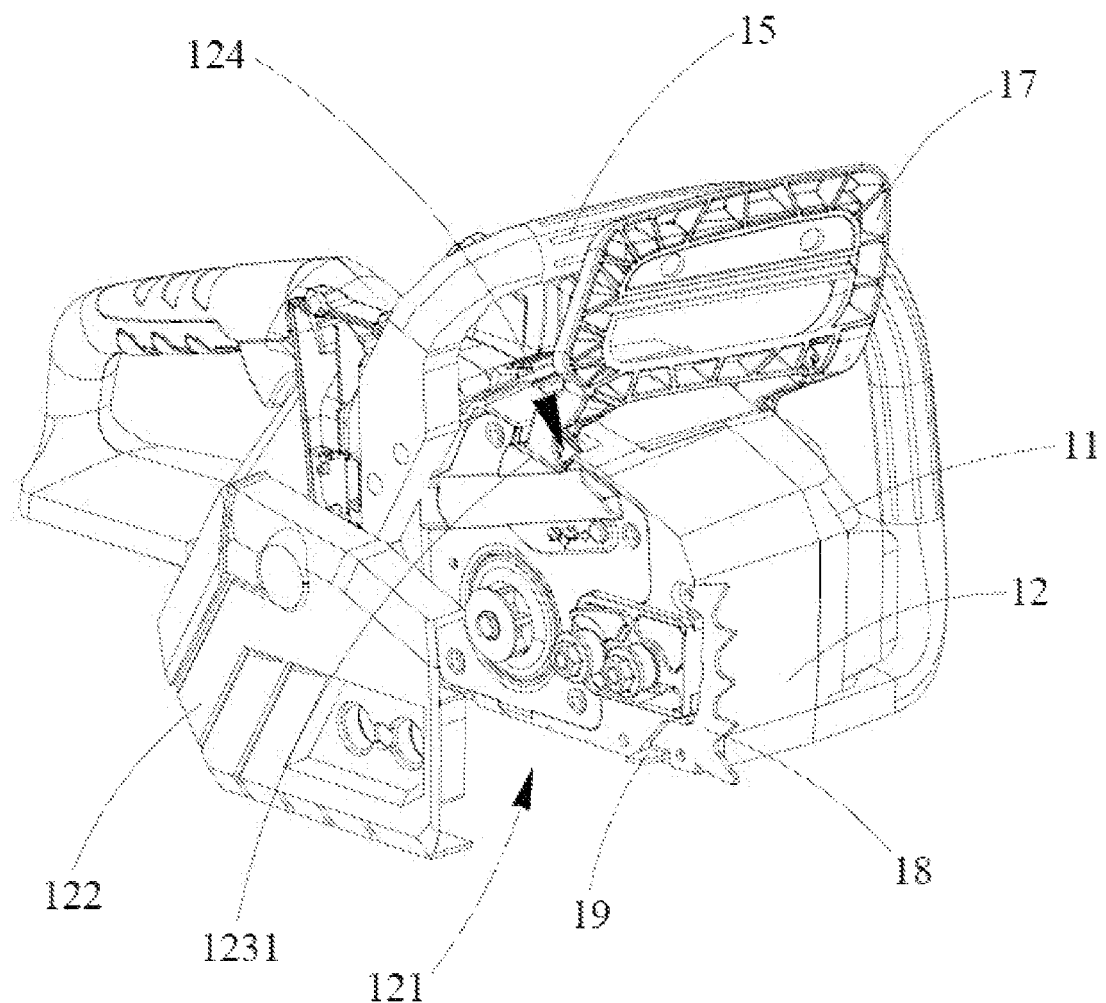
FIG. 8 is a partially exploded view of a chain saw in accordance with a third embodiment of the present invention.
Figure 9:
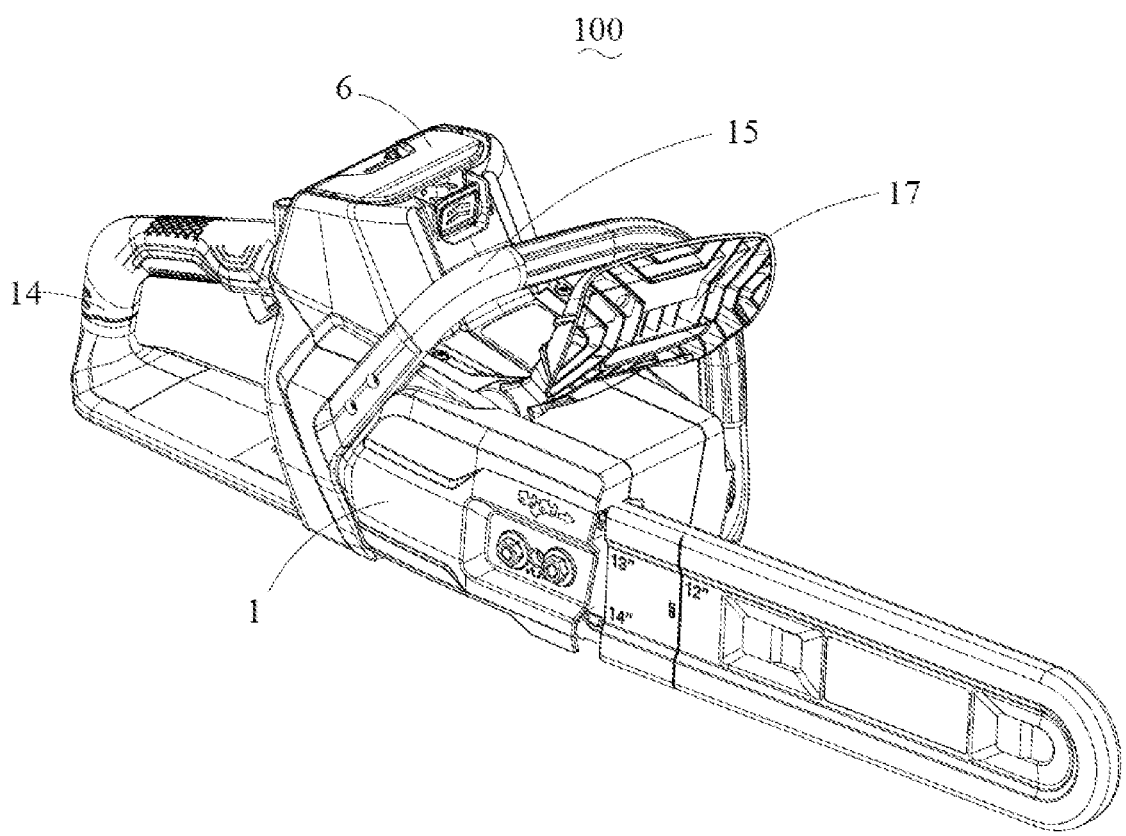
FIG. 9 is a perspective view of a chain saw in accordance with a fourth embodiment of the present invention.

Please refer to FIG. 8, which is a partially exploded schematic view of the chain saw 100 in another embodiment of the invention. In this embodiment, the chain saw 100 is also provided with a wooden insert teeth 18 and a chain block 19 partially received in the mounting groove 121. Specifically, the wooden insert teeth 18 and the chain block 19 are fixed to the holding portion 161 and/or in the mounting groove 121 through a locking structure that penetrates the holding portion 161 to connect the second housing 12 and the second fixing part 153, and partially protrude from the mounting groove 121. Preferably, the wooden insert teeth 18 and the chain block 19 are integrally formed, and the wooden insert teeth 18 and chain block 19 are made of metal materials.

Figure 2:
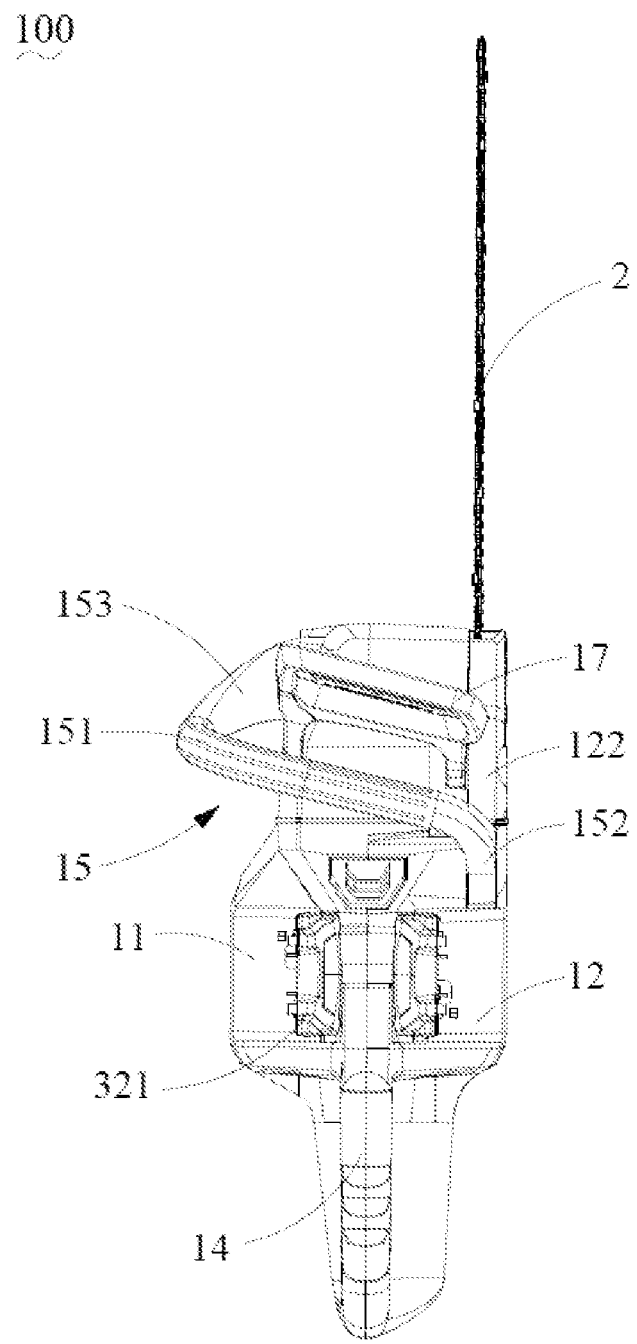
FIG. 2 is another perspective view of the chain saw shown in FIG. 1.
Figure 3:
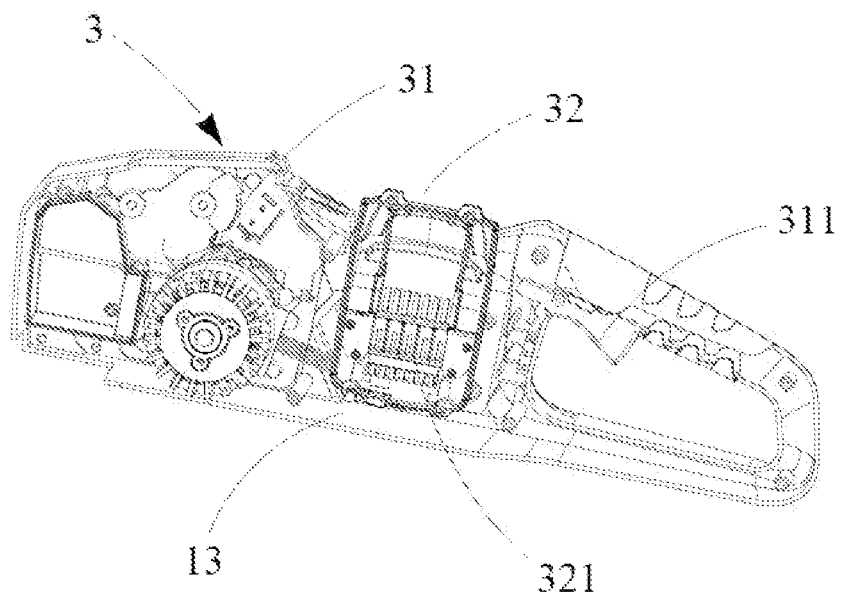
FIG. 3 is a perspective view of the chain saw showing an internal structure of the housing in FIG. 1.

Please refer to FIGS. 1 to 3, the cutter 2 is installed at the front end of the housing 1 to achieve the cutting operation. In the invention, the cutter 2 includes a blade chain 21 and a blade bar 22 for supporting the blade chain 21. The blade bar 22 is fixed on the mounting groove 121 by a fastener 221 (as shown in FIG. 4), and is partially received in the installation cavity. The blade chain 21 is arranged around the blade bar 22 and can be rotated at a high speed under the driving action of the power assembly 3.

The power assembly 3 includes a drive unit 31 for driving the cutter 2 and a power supply unit 32 for providing electrical energy to the drive unit 31. Further, the drive unit 31 is housed in the receiving cavity 13, and the power assembly 3 also includes a control trigger 311 for controlling the drive unit. Specifically, the control trigger 311 is arranged on the rear handle 14, and is partially housed in the rear handle 14.

The power supply unit 32 includes a power supply socket 321 and a battery pack (not shown) detachably connected to the power supply socket 321, and the power supply socket 321 is provided between the rear handle 14 and the front handle 15. Further, The battery pack is arranged such that a center of gravity of the chainsaw 100 when viewed from a rear side is located within a range of 2 times a horizontal width of the rear handle 14 on both right and left sides of a center line vertically extending at a center in a left and right direction of the rear handle 14. Such a setting can effectively guarantee the stability of the chain saw 100 when placed.

In a embodiment of the invention, two power supply sockets 321 are symmetrically arranged, and they are respectively located outside the first housing 11 and the second housing 12, so that the battery pack is inserted and fixed on the outside of the housing 1. Such a configuration can facilitate the replacement and charging of the battery pack, and further improve the practicability of the chain saw 100.

Specifically, the power supply unit 32 further includes an engaging member labeled) provided on the housing 1 for engaging the battery pack, and the power supply socket 321 is provided corresponding to the engaging member, so that the battery pack is detachably connected to the housing 1 through the engaging member and electrically connected to the power supply socket 321. In this embodiment, the engaging member includes a cavity and a guide groove arranged in the cavity, and the engaging members are symmetrically arranged on both sides of the housing 1. The power supply socket 321 is accommodated in the cavity, and the battery pack is housed in the cavity by the guide groove to provide the stabilized electrical connection between the battery pack and the power supply socket 321, and effectively avoid the abnormal power supply of the chain saw 100 caused by the falling off between the battery pack and the cavity.

It should be noted that, only the combination of a cavity and the guide groove as an example of the engaging member is used for illustration. In other embodiments, the engaging member may also be a structure for connecting/receiving the battery packs. The structure may be a holding groove or a connecting protrusion disposed on the housing 1. One engaging member can engage and connect at least one battery pack. The structure of the power supply unit 32 shown in the drawings of the specification of the present invention is only an example, which should not be limited herein.

In summary, the chain saw 100 is provided with a connection form of the front handle 15 and the housing. The first fixing part 152 and the second fixing part 153 of the front handle 15 are fixed to the second housing, which simplifies the production process of the chain saw 100 and effectively save the assembly time of the chain saw 100. The first housing 11 is surrounded by the grip portion 151 to protect the first housing 11, which effectively improves the load-bearing strength of the chain saw 100, and reduces the manufacturing cost of the first housing 11 when meeting the drop test performance of the chain saw 100. This is beneficial to the optimization and reduction of the cost of the chain saw 100, and the chain saw 100 of the present invention is suitable for production and use.

At the same time, by using the protective plate 17 of the chain saw 100 to connect the braking mechanism, it prevents the chain saw 100 from accidentally injuring the user when an accident occurs. On the other hand, by providing a middle cover 123 covering the protective plate 17 which includes a discharge port 1231, which prevents sawdust from entering the receiving cavity 13 of the chain saw 100 from the connecting port 124 at the connection between the protective plate 17 and the second housing 12, and avoid the abnormal use of the chain saw 100 caused by the sawdust going into the brake, transmission and power assembly 3. This improves the safety and service life of the chain saw 100. At the same time, the sawdust generated during the use of the chain saw 100 can enter the installation cavity along the discharge port 1231, and discharge the chain saw 100 through the installation cavity, further improving the practicality of the chain saw 100.

FIG. 9 to FIG. 13 depict a chain saw 100 according to a fourth embodiment of the present invention. Please refer to FIG. 9 and FIG. 10, the chain saw 100 includes a housing 1, a handle provided on the housing 1, and a protective plate 17. The housing 1 is provided with an outlet opening 44 to discharge the sawdust brought inside the chain saw 100 when cutting to the outside of the housing 1, so that it is difficult for the sawdust to accumulate inside the chain saw 1, which improves the reliability of the chain saw 100 when braking, and further improves the using safety of the chain saw 100.

Specifically, in this embodiment, the chain saw 100 further includes a battery pack 6 to provide energy for the chain saw 100. In other embodiments, the chain saw 100 can also be connected to an external power source, an internal combustion engine, etc. The protective plate 17 is arranged at a distance from the front handle 15 and on a side of the front handle 15 away from the rear handle 14. The chain saw 100 further includes a brake system 40.

Figure 11:
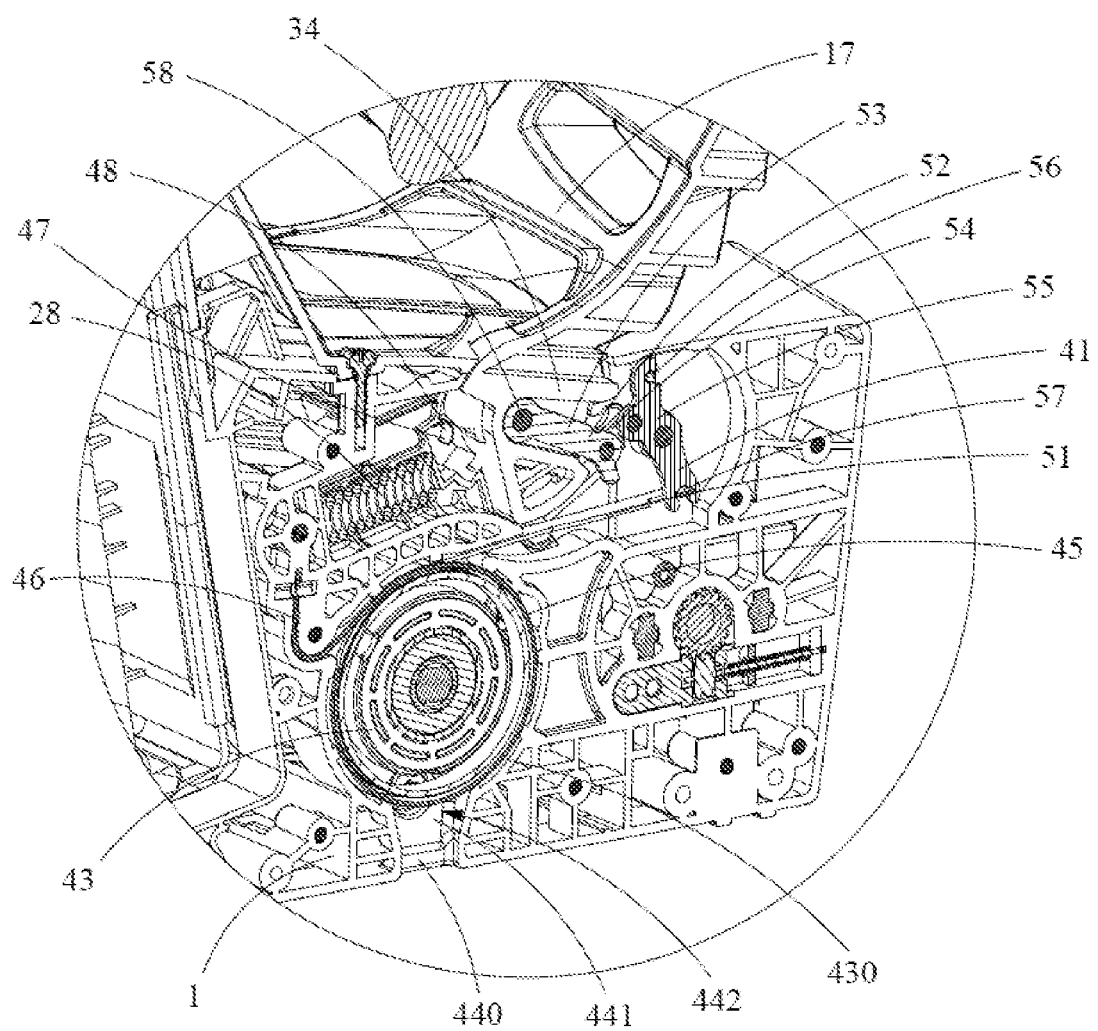
FIG. 11 is a schematic cross-sectional view of the mechanical brake system after it is activated.

The protective plate 17 can rotate back and forth relative to the housing 2, and the rotation of the protective plate 17 can activate the brake system 40 of the chain saw 100 to protect the user in an emergency. The braking system 40 includes a mechanical braking system 41 and an electronic braking system 42 (as shown in FIG. 11). The protective plate 17 can be rotated by the user relative to the housing 2 and simultaneously activate the mechanical braking system 41 and the electronic brake system 42.

Figure 10:
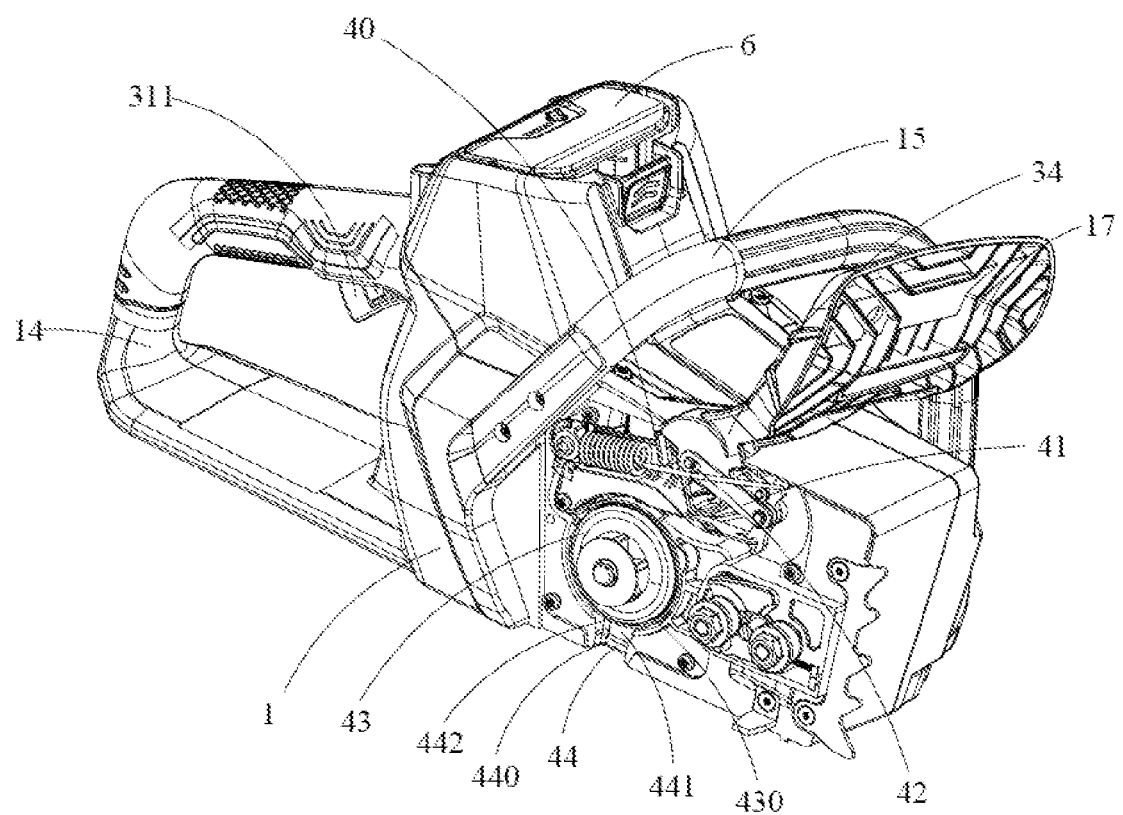
FIG. 10 is a partially perspective view of the chain saw in FIG. 9.

Please refer to FIG. 10 and FIG. 11, specifically, in this embodiment, the outlet opening 44 is provided at the bottom of the housing 2. The outlet opening 44 includes a first part 440 communicating with the outside and a second part 441 connecting the first part 440 and the inside of the housing 2. The second part 441 includes an inclined guide surface 442 to guide the sawdust inside the housing 2 to the first part 440 and the sawdust is discharged outward. The cross section of the outlet opening 44 is rectangular or U-shaped, and can also be a regular or irregular shape such as a circle, an ellipse, a sector, and a polygon.

Figure 12:
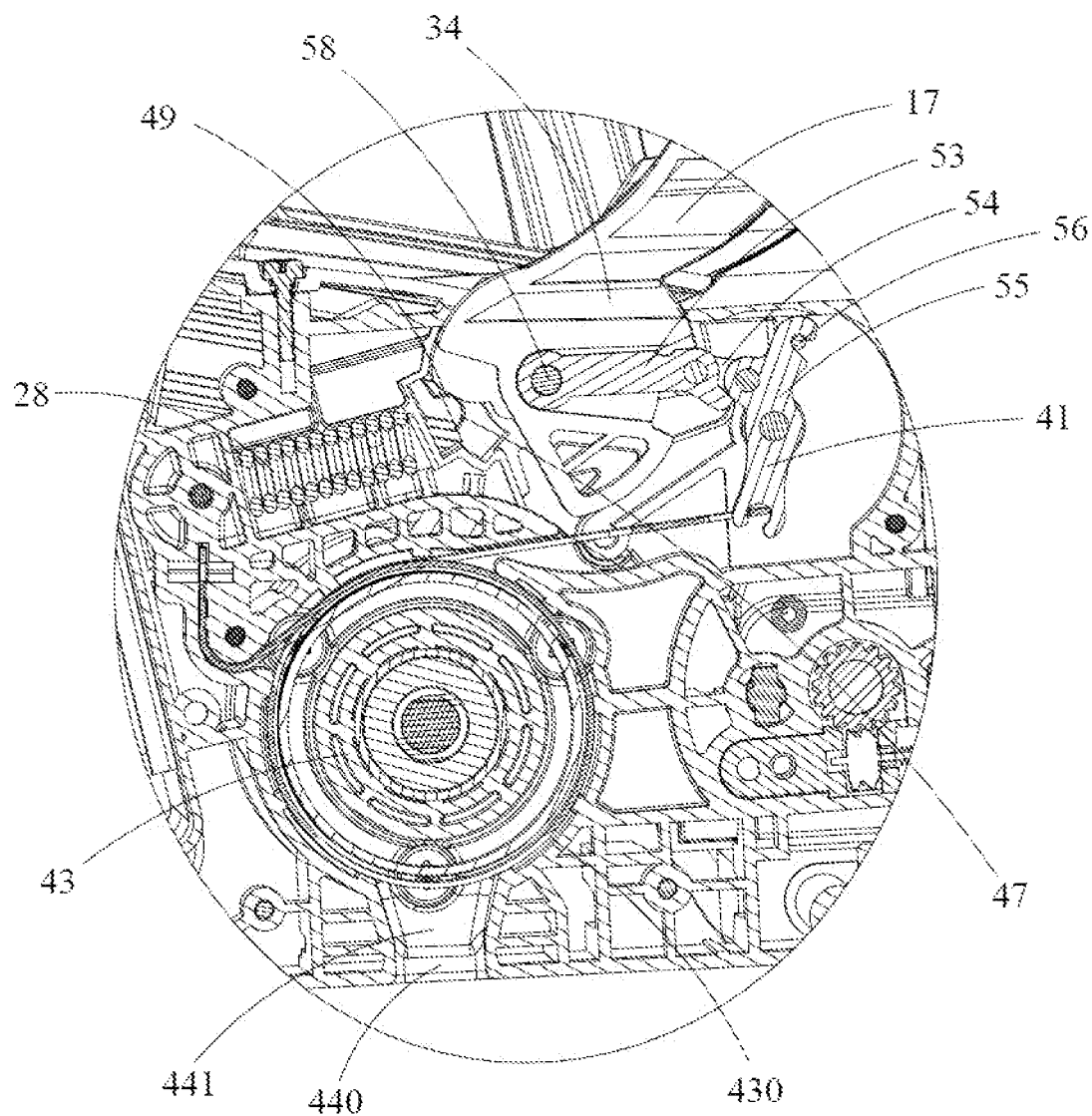
FIG. 12 is a schematic cross-sectional view of the mechanical brake system after it is released.
Figure 13:
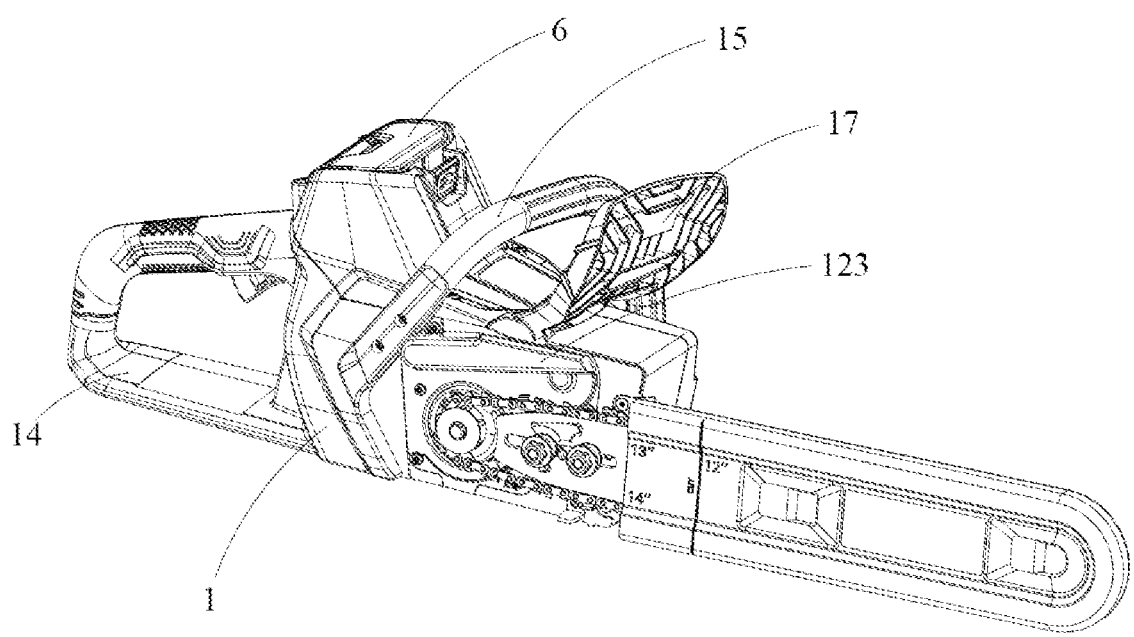
FIG. 13 is a perspective view of the chain saw shown in FIG. 9 after the middle cover is exposed.

Please refer to FIG. 13, The middle cover 123 encloses the brake system 40 of the chain saw 100 in the housing 2. Please refer to FIG. 11 and FIG. 12, the chain saw 100 further includes a clutch drum 43 and a clutch chamber 430 in which the clutch drum 43 is placed. Of course, it is understandable that the brake structure is not limited to the clutch drum 43. A brake disc with a brake lock structure can also be provided on the chain saw as a braking device, and a brake disc chamber can be provided to accommodate the brake disc (not shown). Specifically, the clutch chamber 430 is provided on the housing 2. The second part 441 of the outlet opening 44 communicates with the lower part of the clutch chamber 430 to discharge the sawdust entering the clutch chamber 430. The brake system 40 of the chain saw 100 generates vibration when it is running, and the sawdust that has come into the chain saw 100 and been collected in the clutch chamber 430 is discharged through the outlet opening 44 via this vibration. The sawdust enters the inside of the chain saw from the connecting port 124, passes through the discharge port 1231, and is finally discharged from the outlet opening 44.

Please refer to FIG. 11 and FIG. 12, the protective plate 17 is provided with a support arm 34, which can be swingably supported around the swing axis 58. The mechanical braking system 41 can be activated via the protective plate 17, and it includes a crank mechanism 52 matched with the protective plate 17, a swing lever 55, a brake band 45, and an elastic element 28 matched with the swing lever 55. The crank mechanism 52 includes a first arm 53 and a second arm 54 pivotally mounted on the housing 2. One end of the second arm 54 is pivotally mounted on the end of the first arm 53 away from the housing 2, and the other end is pivotally mounted on the swing lever 55. One end of the swing lever 55 is matched with the elastic element 28 and the other end is fixed on the brake band 45. The brake band 45 surrounds the clutch drum 43 and includes a first end 57 fixed on the swing lever 55 and a second end 46 fixed on the housing 2.

Please refer to FIG. 11, when the protective plate 17 is pushed forward. That is, the protective plate 17 is pushed to rotate towards the chain, and the protective plate 17 abuts the first arm 53 to force the first arm 53 to move to guide the crank mechanism 52 beyond its dead point, so that the swing lever 55 rotates under the action of the elastic element 28, and drives the first end 57 of the brake band 45 away from the clutch drum 43, which makes the brake band 45 abut the clutch drum 43 to achieve a braking effect. Please refer to FIG. 12, when the protective plate 17 is pushed to rotate backward. That is, when the protective plate 17 is pushed to rotate toward the front handle 15, the protective plate 17 abuts the first arm 53 to force the first arm 53 to move to guide the crank mechanism 52 beyond its dead point and forcing the swing lever 55 to rotate, so that the elastic element 28 undergoes elastic deformation under the action of the swing lever 55. At this time, the first end 57 of the brake band 45 moves toward the clutch drum 43 under the action of the swing lever 55, so that the brake band 45 is out of contact with the clutch drum 43, thereby achieving release the brake. Further, the chain saw 100 may also be provided with a reset elastic element (not shown), so that the protective plate 17 is reset under the action of the reset elastic element after being manipulated forward or backward.

Please refer to FIG. 11 and FIG. 12, the electronic brake system 42 includes a switch spring 48 matched with the protective plate 17. When the protective plate 17 is pushed forward to rotate, the support arm 34 abuts the switch spring 48. At this time, the switch spring 48 is compressed and turns off the power supply of the power system of the chain saw 100 to start the electronic brake system 42. With this arrangement, even when the mechanical braking system 41 fails, the user can still brake through the electronic brake system 42, thereby further improving the safety performance of the chain saw 100. In this embodiment, when the protective plate 17 is rotated, the mechanical braking system 41 and the electronic brake system 42 work at the same time. However, it is understandable that only the mechanical braking system 41 or the electronic brake system 42 can be activated when the protective plate 17 to achieve the brake of the chain saw in time.

Compared with the prior art, the chain saw 100 of the present invention is provided with an outlet opening 44 on the housing 2 to discharge the sawdust in the chain saw 100 to the outside of the housing 2 when cutting, so the sawdust is difficult to accumulate inside the chain saw, which improves the reliability of the chain saw during braking, and further improves the safety performance of the chain saw during use.

The above embodiments are only used to illustrate the technical solutions of the present invention and not to limit them. Although the present invention has been described in detail with reference to the preferred embodiments, those of ordinary skill in the art should understand that the technical solutions of the present invention can be modified or equivalently replaced without departing from the spirit and scope of the technical solution of the present invention.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc., do not preclude a plurality, Reference signs in the claims are provided merely as a clarifying example and shall not be construed as limiting the scope of the claims in any way.

What is claimed is:
1. A chain saw, comprising:
    a housing, the housing including a first housing portion, a second housing portion, and a receiving cavity formed by the first housing portion and the second housing portion;

a cutter including a blade chain and a blade bar for supporting the blade chain, the cutter being mounted on the housing;

a power assembly, the power assembly comprising a drive unit for driving the cutter and a power supply unit for supplying power to the drive unit;

a front handle connected to the second housing portion and surrounding the first housing portion, the front handle comprising a grip portion, a first and second fixing parts which are located at two ends of the grip portion, the first fixing part abutting on the side wall of the second housing portion, and the second fixing part being located at the bottom of the housing and connecting with the second housing portion;

wherein the second housing portion is provided with a holding portion for defining the second fixing part, and the holding portion extends downward from the side wall of the second housing portion;

wherein the second housing portion is provided with a mounting groove recessed from a side wall thereof into the housing and a mounting portion detachably mounted on a side wall of the second housing portion, the mounting portion being engaged with the mounting groove to form a mounting cavity for receiving the cutter;

wherein the holding portion is provided with a step portion which is located in the mounting groove, and the step portion is formed by recessing to the inside of the housing from a surface of the mounting groove, and the second fixing part is connected and positioned with the second housing portion through a locking structure penetrating the non-step portion and the step portion of the holding portion.

2. The chain saw according to claim 1, wherein a receiving groove for receiving the second fixing part is provided at the bottom of the housing, and the holding portion is located at an end of the receiving groove.

3. The chain saw according to claim 2, wherein the receiving groove is formed by recessing from the bottom of the first housing portion and the second housing portion toward the inside of the housing.

4. The chain saw according to claim 1, wherein the second fixing part is connected and positioned with the second housing portion through a locking structure, and the locking structure penetrates the holding portion from a side wall of the second housing portion and protrudes into the second fixing part, so that the second fixing part is fixedly connected to the second housing portion.

5. The chain saw according to claim 1, wherein the housing further comprises a rear handle provided at the rear end thereof, the rear handle is provided with a control trigger for controlling the drive unit, and the control trigger is partially received in the rear handle.

6. The chain saw according to claim 5, wherein the power supply unit comprises a power supply socket, and the power supply socket is disposed between the rear handle and the front handle.

7. The chain saw according to claim 1, wherein a protective plate is provided on the top of the housing, the protective plate being at the front of the grip portion, and the height of the protective plate being higher than that of the grip portion, the width of the protective plate being larger than a width of the housing.

8. The chain saw according to claim 7, wherein the protective plate is connected to a braking mechanism, and the braking mechanism is housed in the receiving cavity.

9. The chain saw according to claim 8, wherein the mounting groove is provided with a middle cover, and the protective plate connects with the braking mechanism received in the receiving cavity through a connecting port provided on the second housing portion, the middle cover covering the protective plate and the mounting groove, and the middle cover comprising a discharge port corresponding to the connecting port.

10. The chain saw according to claim 1, further comprising a battery pack to provide energy for the chain saw.

11. The chain saw according to claim 1, wherein the housing includes an outlet opening to discharge the sawdust brought inside the chain saw when cutting to the outside of the housing, and the outlet opening is located at the bottom of the housing.

12. The chain saw according to claim 11, wherein the outlet opening comprises a first part communicating with the outside and a second part connecting to the first part and the inside of the housing, the second part comprising an inclined guide surface to guide the sawdust inside the housing to the first part to be discharged to the outside.

\* \* \* \* \*